(12) United States Patent
Kurzweil

(10) Patent No.: US 6,199,042 B1
(45) Date of Patent: Mar. 6, 2001

(54) READING SYSTEM

(75) Inventor: Raymond C. Kurzweil, Newton, MA (US)

(73) Assignee: L&H Applications USA, Inc., Burlington, MA (US)

( * ) Notice: Subject to any disclaimer, the term of this patent is extended or adjusted under 35 U.S.C. 154(b) by 0 days.

(21) Appl. No.: 09/100,299

(22) Filed: Jun. 19, 1998

(51) Int. Cl.$^7$ .................................................. G09B 5/04
(52) U.S. Cl. ........................... 704/260; 704/278; 434/309
(58) Field of Search .................................... 704/260, 258, 704/243, 503, 504, 278; 434/317, 318, 319, 308, 307 A, 307 R, 309, 185; 345/901, 957, 956, 145, 146, 162, 208, 173, 340; 84/609

(56) References Cited

U.S. PATENT DOCUMENTS

| | | | |
|---|---|---|---|
| 4,698,625 | * 10/1987 | McCaskill et al. | 345/157 |
| 5,538,430 | * 7/1996 | Smith et al. | 434/178 |
| 5,617,507 | * 4/1997 | Lee et al. | 704/200 |
| 5,623,679 | * 4/1997 | Rivette et al. | 707/526 |
| 5,663,748 | * 9/1997 | Huffman et al. | 345/173 |
| 5,875,428 | * 2/1999 | Kurzweil et al. | 704/260 |

OTHER PUBLICATIONS

Holmes, "Speech Synthesis and Recognition", 1995, Chapman And Hill, 72–75.*

* cited by examiner

*Primary Examiner*—David R. Hudspeth
*Assistant Examiner*—Harold Zintel
(74) *Attorney, Agent, or Firm*—Bromberg & Sunstein LLP

(57) ABSTRACT

A reading system includes a computer and a mass storage device and software including instructions for causing a computer to accept an image file generated from optically scanning an image of a document. The software converts the image file into a converted text file that includes text information, and positional information associating the text with the position of its representation in the image file. The software records the voice of an operator of the reading machine as a series of voice samples in synchronization with a highlighting indicia applied to a displayed representation of the document and stores the series of voice samples in a data structure that associates the voice samples with displayed representation. The reading machine plays back the stored, recorded voice samples corresponding to words in the document as displayed by the monitor while highlighting is applied to the words in the displayed document.

7 Claims, 18 Drawing Sheets

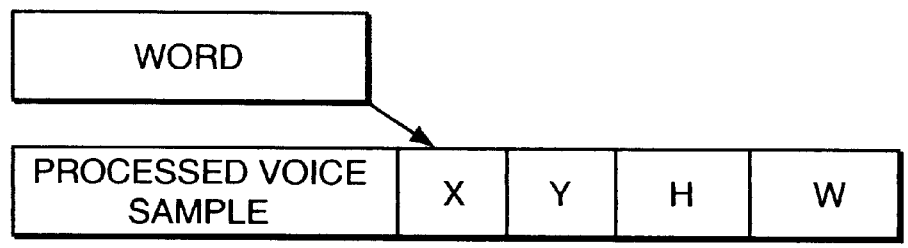
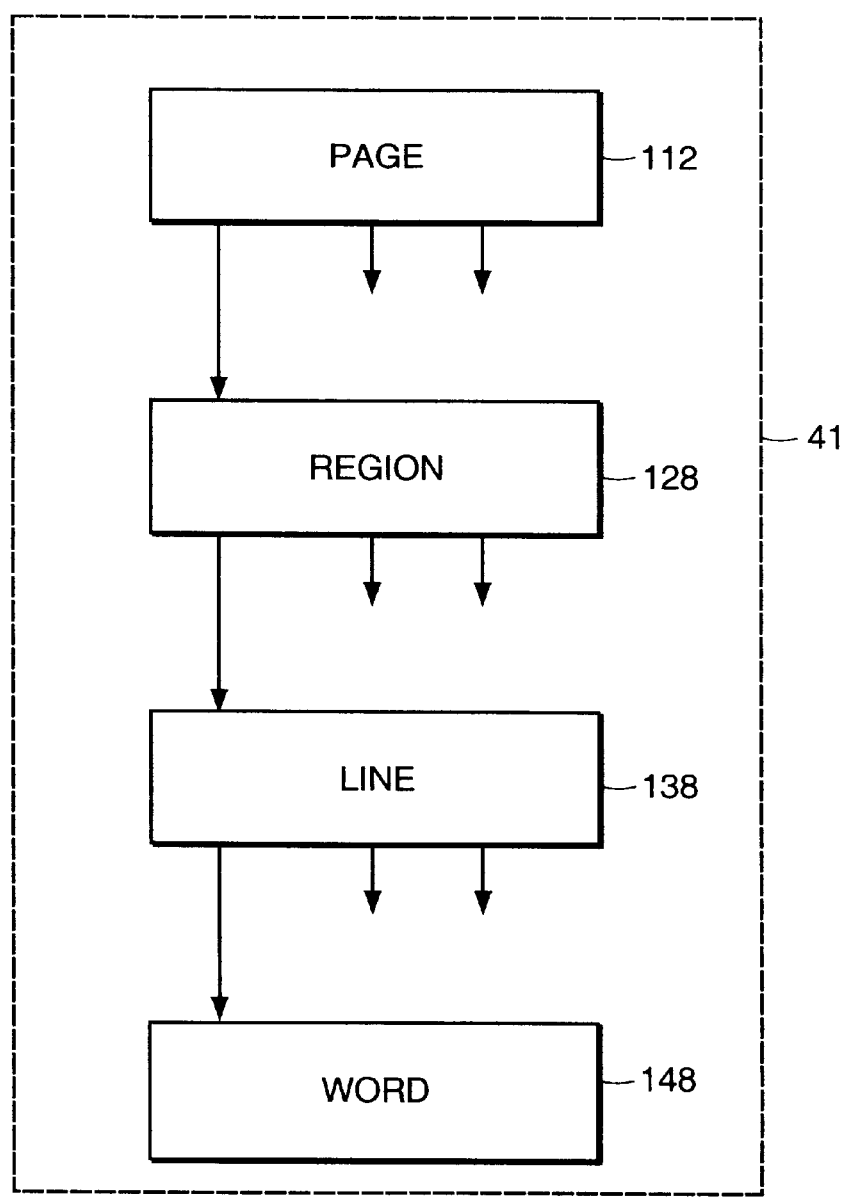
FIG. 3C

| RECORDED SAMPLE | DATA STRUCTURE 35 |
|---|---|
|  |  |
| SAMPLE i | ENTRY IN 35 |
|  |  |

READING SYSTEM

BACKGROUND

This invention relates to reading machines that read aloud electronic representations of displayed documents.

Reading machines have been used to improve the educational attainment of individuals with learning disabilities. In general, reading machines are computer-based having specialized software that processes an input source document and generates synthetic speech. This enables the user to hear the computer read the document a word, line, sentence, etc. at a time. Often these reading machines include a scanner to provide one technique to input source documents to the reader.

The scanner provides an image file representation of a scanned document. The personal computer using optical character recognition software produces an OCR file including generated text information. The OCR file is used by the display system software to display a text-based representation of the scanned document on the monitor. The OCR file text is also used by speech synthesis software to synthesize speech. Techniques are known for applying highlighting to displayed text of a document synchronized with synthesized speech corresponding to the highlighted text.

SUMMARY

In one aspect of the invention, a computer program product residing on a computer readable medium includes instructions for causing a computer to display a representation of a document on a computer monitor. The product also causes the computer to read the displayed representation of the document by using a recorded human voice. Optionally the recorded human voice is synchronized with highlighting applied to the displayed representation. The computer program product uses information associated with a text file to synchronize the recorded human voice and the highlighting to the displayed representation of the document.

With a further aspect of the invention, a computer program residing on a computer readable medium includes instructions for causing a computer to record the voice of an operator of the reading machine as a series of voice samples in synchronization with a highlighting indicia applied to a displayed document and store the series of voice samples in a data structure in a manner that associates the series of voice samples with displayed positions of words in the document.

According to a further aspect, a computer program product residing on a computer readable medium includes instructions for causing a computer to playback recorded voice samples corresponding to words in a document displayed by a monitor of the computer and highlight words in the displayed document in synchronization with the recorded voice samples.

According to a still further aspect of the invention, a reading system includes a computer which includes a processor and a computer monitor for displaying an image representation of a scanned document. The computer also includes a scanner for scanning documents, speakers for providing an audio output and a mass storage device storing a computer program product including instructions for causing the computer to display a representation of a document on the computer monitor and apply digitized, voice samples of the document to an audio system to cause the computer to output a human voice pronunciation of the document.

According to a still further aspect, a method of operating a reading machine includes displaying a representation of a document and using positional information from a text file associated with the document to apply digitized, voice samples of the document to an audio system causing the reading machine to read the document aloud with a recorded human voice pronunciation of the document.

In this manner, a more pleasing pronunciation of the words in the document is provided. The computer program product can operate in conjunction with a text or image-based representation of the document.

BRIEF DESCRIPTION OF THE DRAWINGS

The foregoing features and other aspects of the invention will be described further in detail by the accompanying drawings, in which:

FIGS. 3C–3D are views of data structures or files used with the processes of FIGS. 3A–3B;

DETAILED DESCRIPTION

Figure 1:
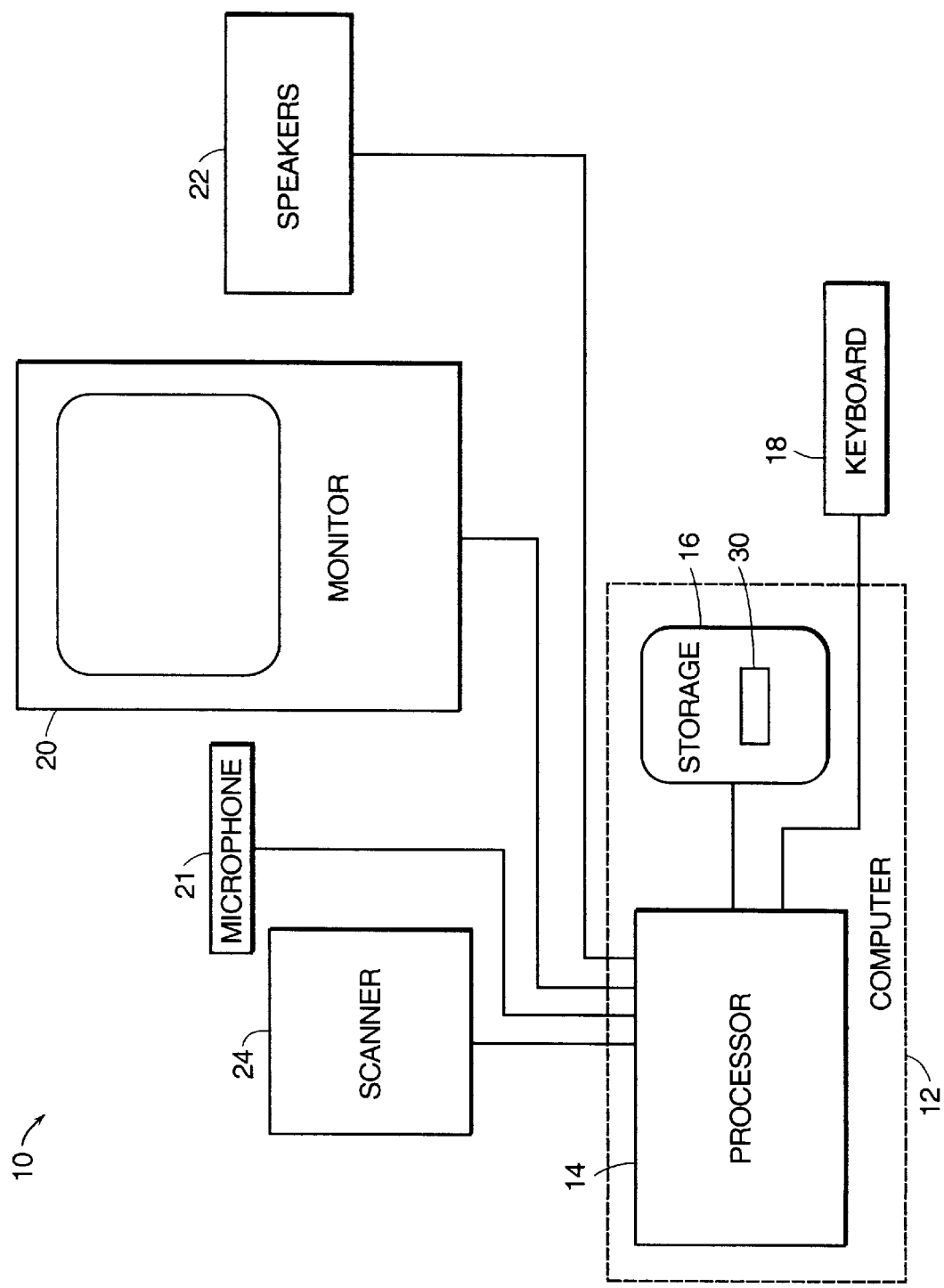
FIG. 1 is a block diagram view of a reading machine system.

Referring now to FIG. 1, a reading machine 10 includes a computer system 12 such as a personal computer. The computer system 12 includes a central processor unit (not shown) that is part of a processor 14. A preferred implementation of the processor 14 is a Pentium-based system from Intel Corporation, Santa Clara, Calif., although other processors could alternatively be used. In addition to the CPU, the processor includes main memory, cache memory and bus interface circuits (not shown). The computer system 12 includes a mass storage element 16, here typically the hard drive associated with personal computer systems.

The reading system 10 further includes a standard PC type keyboard 18, a sound card (not shown), a pointing device such as a mouse 19, a monitor 20, microphone 21, speakers 22, and a scanner 24 all coupled to various ports of the computer system 10 via appropriate interfaces and software drivers (not shown). The computer system 12 here operates under a WindowsNT® Microsoft Corporation operating system although other systems could alternatively be used.

Resident on the mass storage element 16 is image display and conversion software 30 (FIG. 2) that controls the display of a scanned image provided from scanner 24. In addition, the software 30 permits the user to control various features of the reading machine 10 by referencing the image representation of the document as displayed by the monitor.

Figure 2:
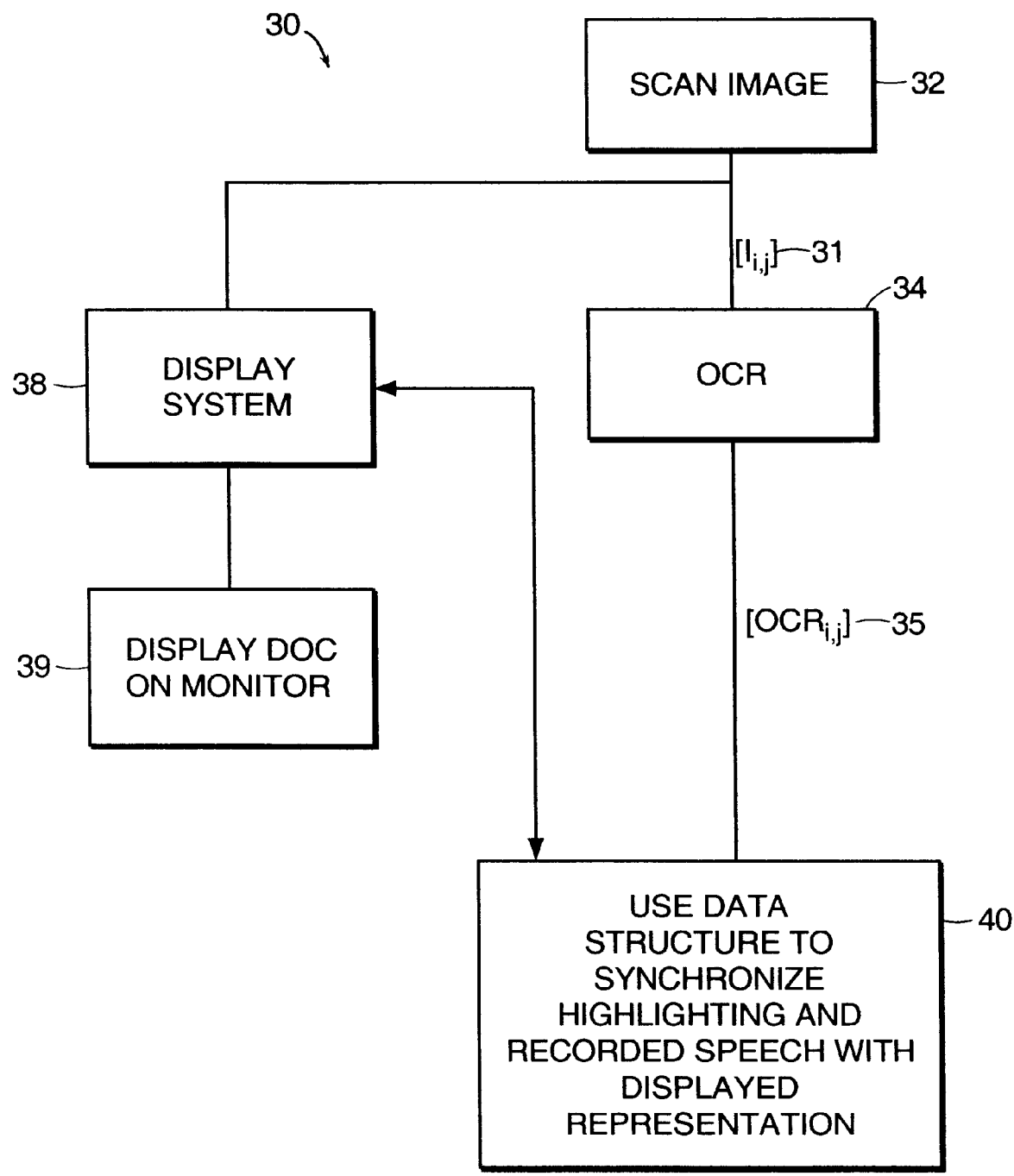
FIG. 2 is a flow chart showing a process to cause the reading system to display and read aloud from a scanned image representation of a document.

Referring now to FIG. 2, the image display and conversion software 30 scans 32 an input document in a conventional manner to provide an image file 31. The image file 31 is operated on by an optical character recognition (OCR) module 34. The OCR module 34 uses conventional optical character recognition techniques (typically software based) on the data provided from the scanned image 32 to produce an OCR data structure 35. Alternatively, image-like representations can be used as a source such as a stored bit-mapped version of a document.

A preferred arrangement of the output data structure is described in conjunction with FIGS. 6–9. Suffice it here to say, however, that the array of OCR data structures generally denoted as 35 includes OCR converted text, positional and size information for each text element. The positional and size information associates each text element to its location in the image representation of the document as displayed on the monitor 20.

Figure 7:
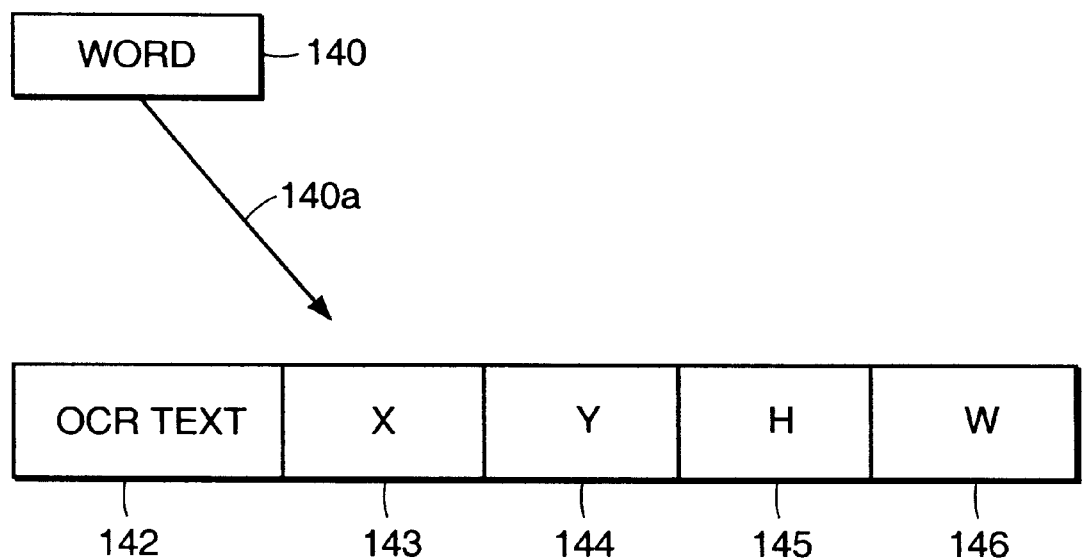
FIGS. 7–9 are diagrammatical views of detailed portions of the data structure of FIG. 6.

Referring momentarily to FIG. 7, it can be seen that a data structure element 140 includes for a particular word an OCR text representation of the word stored in field 142. The data structure 140 also has positional information including X-axis coordinate information stored in field 143, Y-axis coordinate information stored in field 144, height information stored in field 145 and width information stored in field 146. This positional information defines the bounds of an imaginary rectangle enclosing an area associated with the corresponding word. That is, if a pointer device such as a mouse has coordinates within the area of this rectangle, then the mouse can be said to point to the word within the defined rectangle.

The image file 31 is fed to a display system 38 which, in a conventional manner, displays 39 the document represented by the image file on the monitor 20. The text file 35 provides one input along with commands driven by the operating system (not shown) to a module 40 which is used to synchronize highlighting and recorded human speech with an image or text displayed representation of the document. Both the image file 31 and the text file 35 may be stored in the reading system 10 for use during the session and can be permanently stored. The files are stored using generally conventional techniques common to Windows95®, WindowsNT® or other types of operating systems.

Figure 3:
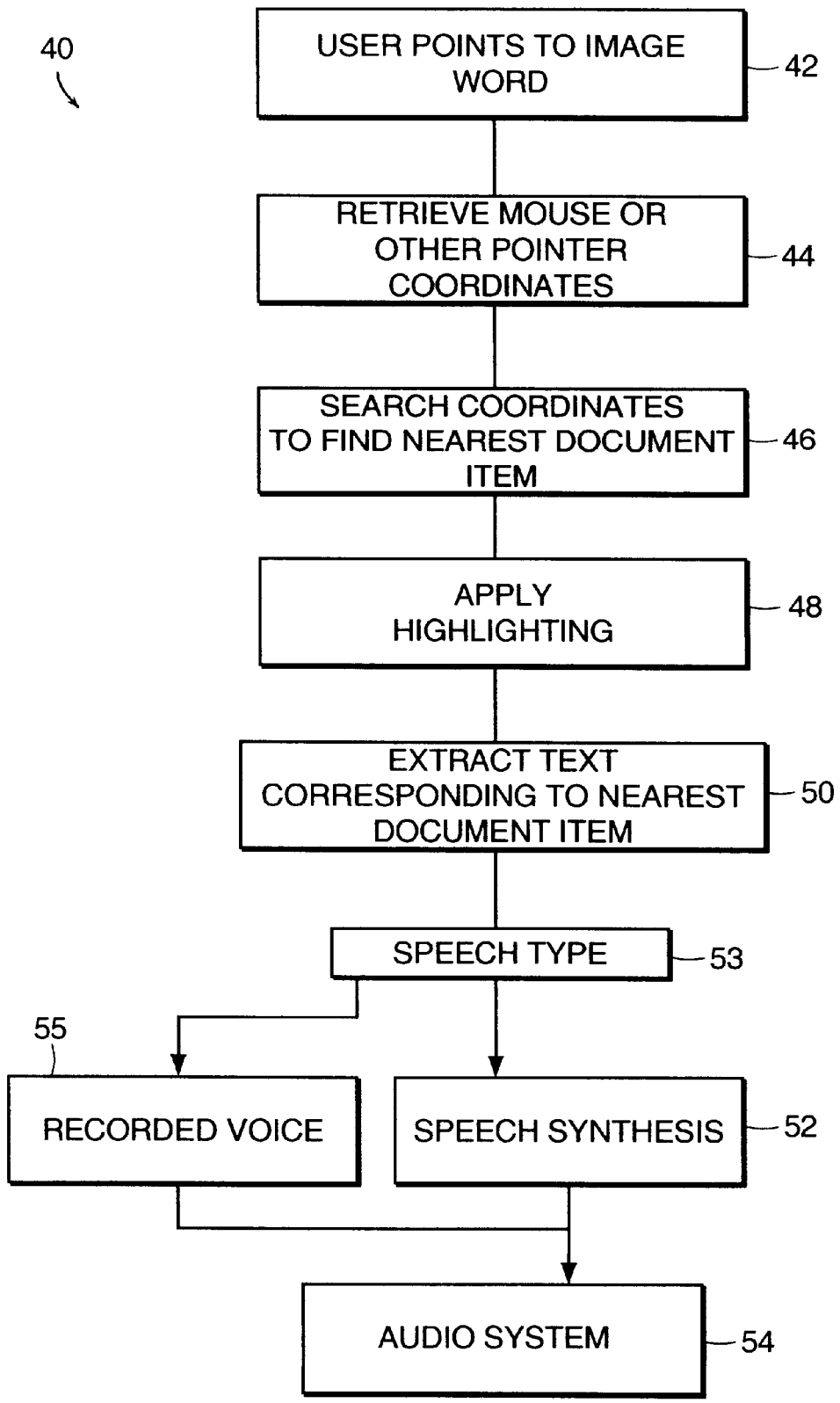
FIG. 3 is a flow chart showing a process used to associate user-selected text on the displayed image representation with recorded human voice samples.

Referring now to FIG. 3, the user controls operation of the reading system 10 with reference to the image displayed on the monitor 20 by the software module 40. A user initiates reading of the scanned document at the beginning of the document by selecting a reading mode. Among other options, the user can select to hear the document read aloud using synthesized speech or a recorded digitized human voice. The user can have the reading machine 10 start reading the document from any point in the document by illustratively pointing to the image representation of an item from the scanned document displayed 42 on the monitor. The document item is the actual image representation of the scanned document rather than the conventional text file representation. The item can be a single word of text, a line, sentence, paragraph, region and so forth.

In addition to pointing to a word, a pointer such as a mouse can point within the text in an image in other ways that emulate the pointer behavior typically used in computer text displays and word processing programs. For instance, by simply pointing to a word the software selects a position in the text before the word; whereas, pointing to a word and clicking a mouse button twice will cause the word to be selected and pointing to a word and clicking an alternate mouse button selects several words, starting at a previously determined point and ending at the word pointed to.

The user can use a mouse or other type of pointing device to select 42 a particular word. Once selected, the software fetches 44 the coordinates associated with the location pointed to by the mouse 19 (FIG. 1). Using these coordinates, the word or other document item nearest to the coordinates of the mouse is determined. The information in the data structure 100 is used to generate highlighting of the word as it appears on the display item as well as recorded digitized speech samples.

While the user can enable the reading machine to generate synthesized speech, it is preferred that the user enable the reading machine to use a recorded digitized human voice to read the document aloud. For purposes of explanation, it will be assumed that the document item is an image representation of a word that is read aloud using a recorded digitized human voice.

Figure 4A:
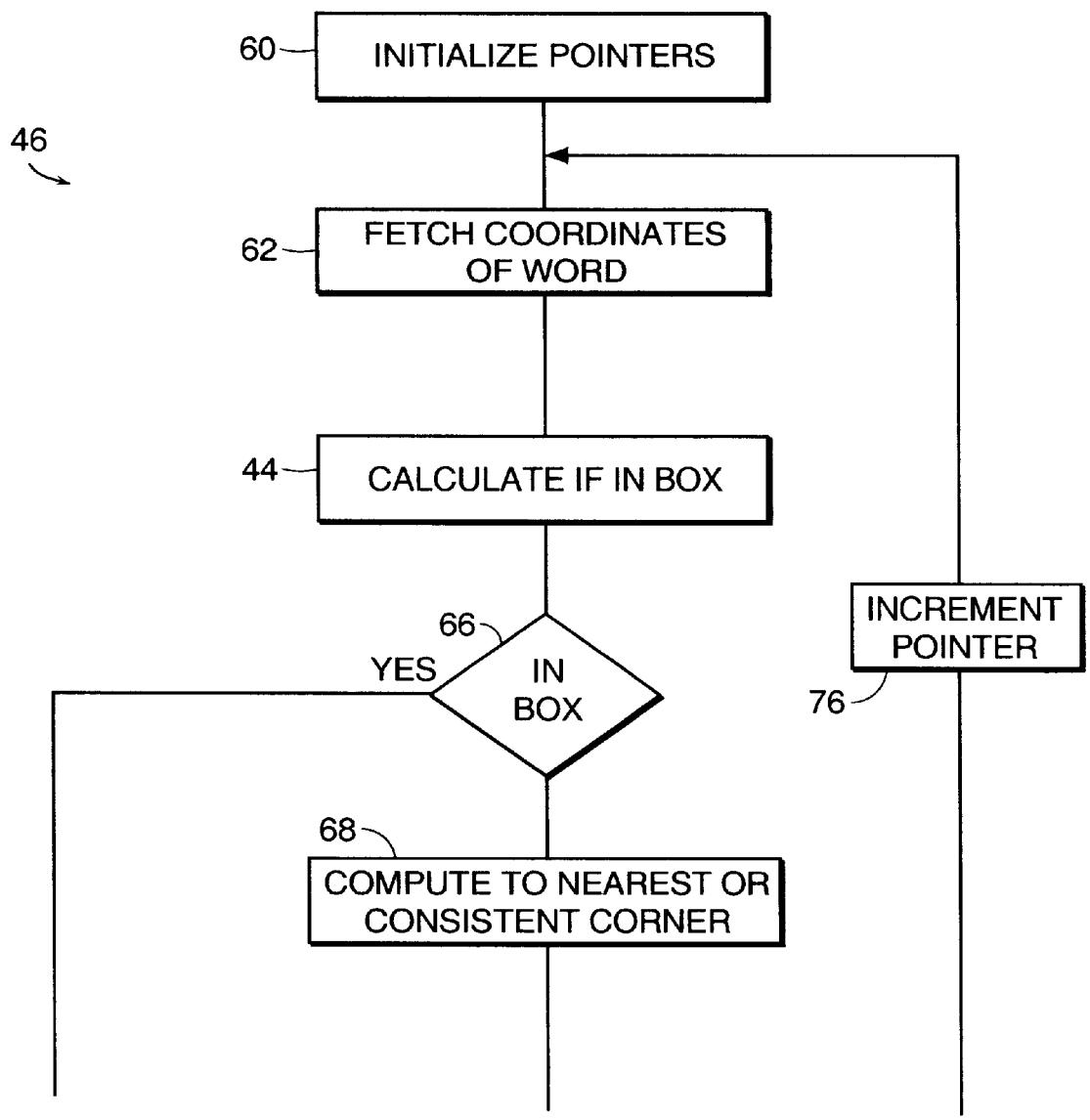
FIGS. 4A–4C are flow charts which show a process to determine a nearest word for use in the process described in conjunction with FIG. 3.
Figure 4B:
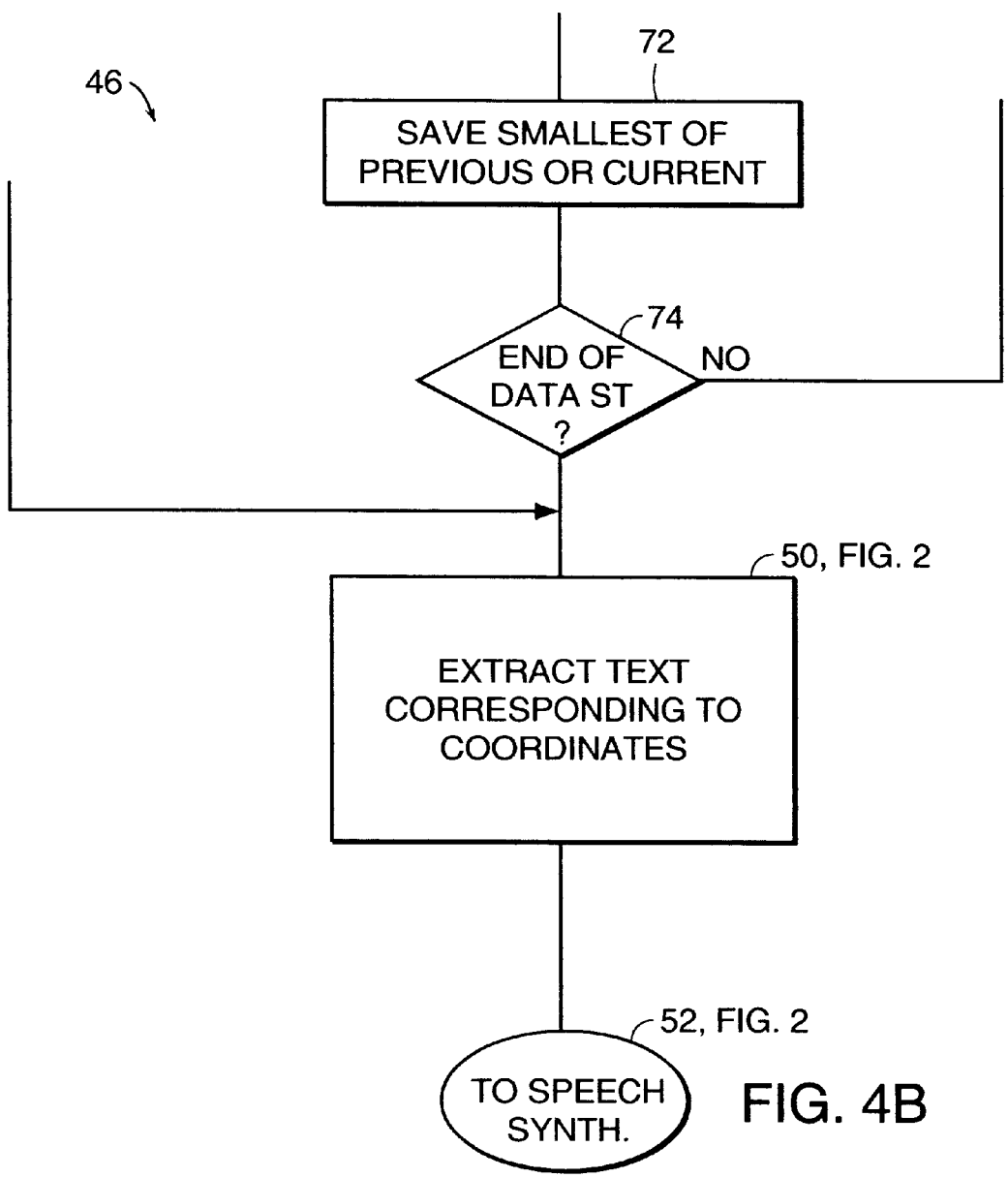
Figure 4C:
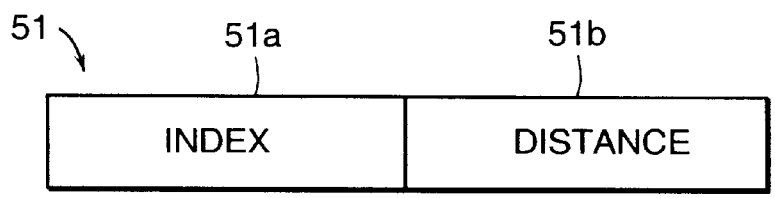

The searching process 46, as will be further described in conjunction with FIGS. 4A–4C, will search for the nearest word. Alternatively, a searching process 46' as will be described with FIGS. 10A–10C can also be used. The search operation performed by searching process 46' is based upon various attributes of a scanned image.

After the nearest word or nearest document item has been determined 46 (or 46'), the highlighting is applied 48 to an area associated with the item or word. The locational information in the text file 35 corresponding to the nearest document item is used to locate in a data structure a stored, recorded digitized human voice pronunciation of the word. The stored samples are retrieved from a data structure 41 or 41' and are fed to the audio system 54 that reads the word aloud. The word is read aloud as the monitor 20 displays the document and highlighting is applied to the word.

Figure 3A:
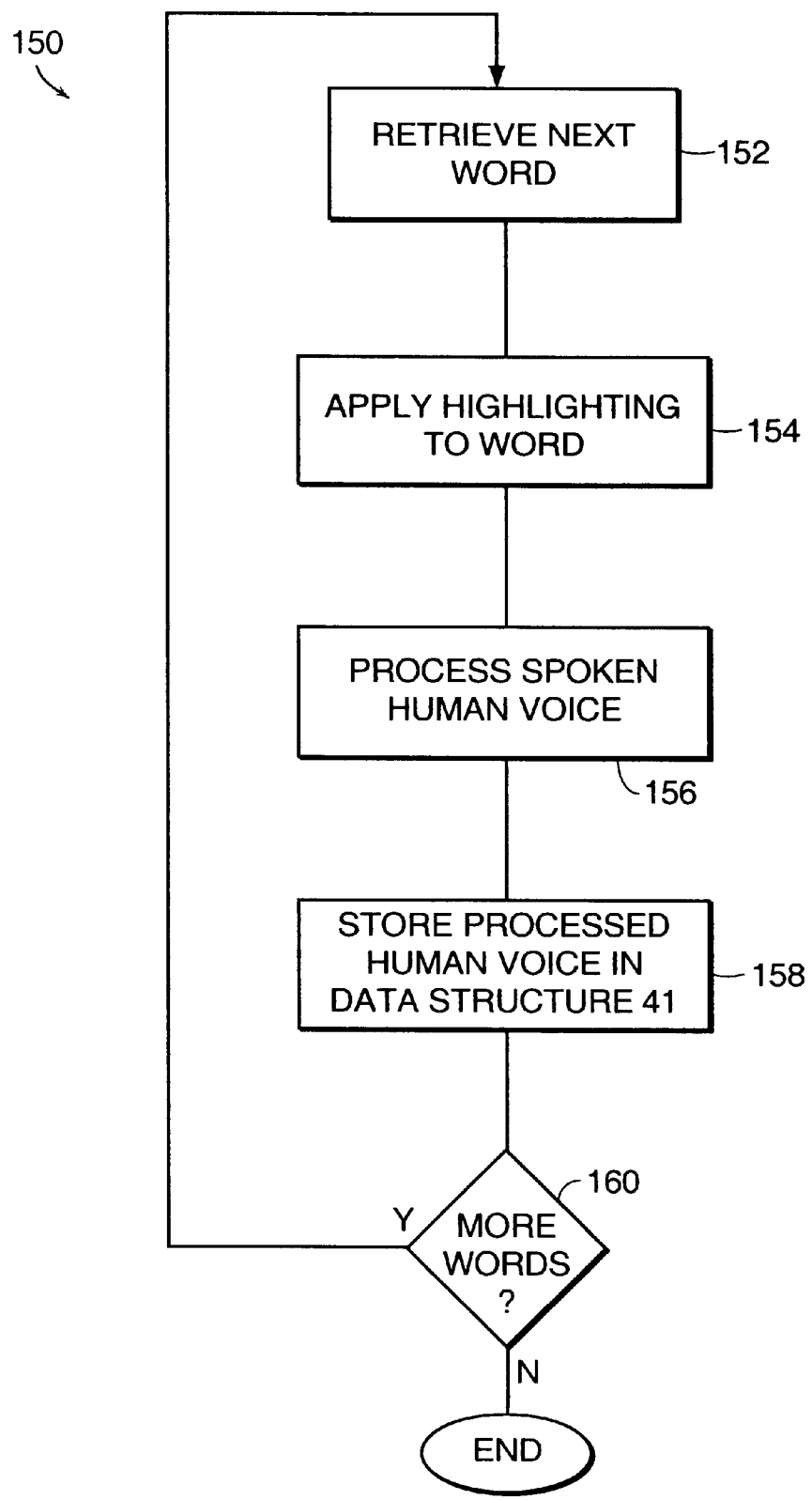
FIGS. 3A–3B are flow charts showing processes for recording and synchronous playback of a digitized human voice in the reading machine system of FIG. 1.

Referring now to FIG. 3A, a recording process 150 that records a human voice as continuous voice samples is shown. The process 150 associates the continuous digitized voice samples with positional information of text in a displayed representation of a document. The recording process 150 displays the document such as an image representation of the document on the display 20 (FIG. 1). An operator of the reading machine 10 will read the document aloud as the reading machine records the operator's voice as a plurality of digitized voice samples which are stored in a file or a data structure 41 (FIG. 3C) or 41' (FIG. 3D). The data structure 41 includes positional information that associates the recorded, plurality of digitized voice samples corresponding to continuous speech to the word in the position of the document as it appears on the display. The data structure 41' includes the plurality of recorded voice samples and links back to the OCR data structure 35.

The operator of the reading machine 10 talks into a microphone 21 (FIG. 1) in synchronization with a highlighting indicia applied, a word at a time, to the displayed document. The operator attempts to synchronize his rate of pronunciation of the word to the rate that highlighting is applied to the word. Generally, the highlighting is applied based upon a text to speech conversion process, as described in conjunction with FIG. 5. The highlighting is applied at a rate in accordance with the rate at which the word is pronounced by the synthesized speech. Thus, for example, a word which takes a long time to pronounce will have highlighting applied for a longer period of time than a word which takes a shorter period to pronounce. Also, punctuation may affect the rate of highlighting. The accuracy of the positional information or links between words and the continuous voice samples is related to the extent that the operator can synchronize his pronunciation to highlighting.

The reading machine 10 retrieves 152 the first or next word in the document and applies highlighting 154 to the word indicating which word the operator should pronounce into the microphone 21. The pronunciation of the word will be recorded and stored as a plurality of digitized voice samples by the reading machine 10 using standard software drivers for the input of audio signals. The digitized voice samples are stored 158 in the data structure 41 along with positional information from data structure 35 or in data structure 41' with links back to data structure 35. This positional information or links, as appropriate, approximate starting samples of words in the document. This process continues at 160 until there are no more words in the document or until the operator terminates the process. At the end of the process 150 a data structure 41 (FIG. 3C) or 41' (FIG. 3D) is populated with the recorded voice samples.

As an alternative to the recording process of FIG. 3A a so-called large vocabulary continuous speech recognition software system available from The Dictation Division of Lernout & Hauspie, formerly Kurzweil Applied Intelligence, Dragon Systems, or IBM can be used to transcribe the recorded speech. These systems, however, would have to be modified so that they would be capable of marking exactly where each word is in the data structures 41 or 41'. The speech recognition is potentially made easier since the transcribed text is provided from the OCR software. Even if the output of the speech recognition is not perfect, it will identify correctly most of the words. This can be used to improve synchronization links.

Figure 3B:
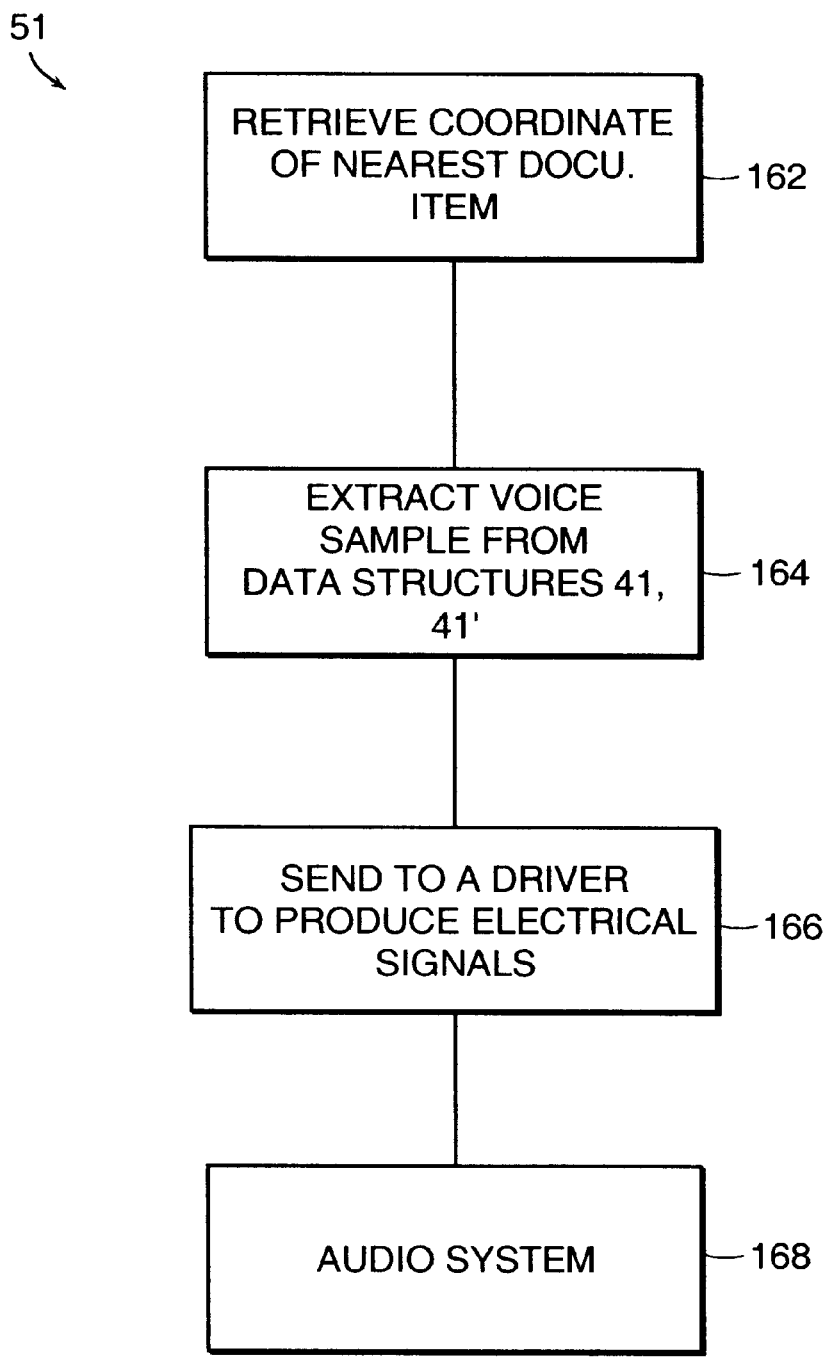
Figure 3D:
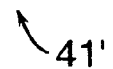

Referring now to FIG. 3B, recorded playback of the voice samples in the reading machine 10 in synchronization with highlighting of words in a displayed document is shown. The process 51 starts with retrieving coordinates of a nearest document item. In general this would be a word pointed to by a mouse. For an image representation there may be some ambiguity in what is actually being pointed to. Therefore the approaches described below can be used to obtain the nearest document item. The coordinates are used to access the data structures 41 or 41' and extract 154 the appropriate voice samples. With data structure 41 a match in coordinates is sought, using one of the two alternate methods described below (methods 46 or 46'), whereas with data structure 41', method 46 (described below) is used, by fetching 162 coordinates of successive words by following each link in data structure 41' to the data structure 35 (FIG. 7) and using the coordinates in data structure 35. The extracted voice samples are sent 166 to a standard software driver for the output of audio signals. The outputted audio signals are fed 168 to the audio system. With the highlighting applied as in 48 (FIG. 3) and the recorded voice samples fed to the audio system, the reading machine 10 reads the document aloud to the user, using the recorded human voice samples, while the reading machine 10 applies highlighting or double highlighting to the displayed representation of the document.

Referring now to FIG. 3C, the data structure 41 includes data structure element 148 in which are stored voice samples associated with the word and positional information such as the X and Y coordinates, and height and width information that associates the word in the document to the stored voice samples. Data structure 41 is similar in design to that of data structure 35. Therefore, data structure 41 includes structures 112, 128 and 138 to represent pages, regions and lines respectively.

As shown in FIG. 3D, data structure 41' stores voice samples stored with links back to the data structure 35. Either the data structure 41 or the data structure 41' associate recorded human voice samples of words in the displayed document to the position of the words in the image or text-based representation of the document.

The positional information in data structure 41 or the links in data structure 41' produced by the above process may be only approximately correct. For many applications this would be sufficient allowing the system to work adequately most of the time. It is possible, however, to improve on the accuracy of the synchronization between the human voice and the displayed words. One technique would have the user of the system 10 play back the recorded voice samples while displaying the document. The word highlighting (either single or double highlighting) is applied to the words and user speeds up or slows down the highlighting process to better synchronize the highlighting to the playback of the recorded human voice. For example, the up and down cursor keys or left and right cursor keys or any other pair of keys can be manipulated to accelerate or decelerate the progress of the word highlighting to improve synchronization of the word highlighting with the recorded human. The user can press the up arrow key and while keeping the key depressed accelerate highlighting. Release of the key would cause the word highlighting to return to its original rate.

Alternatively, the speech rate can be changed. The literature on audio signal processing describes several methods of time-scale modification which can be used to allow the recorded voice samples to be played back at a slower or faster rate without substantially changing the pitch of the voice.

Alternatively, the reading machine 10 can include a visual sound editor that permits the user to play a segment of the voice recording. The operator can then identify the word or words corresponding to the voice recording and correct the positional information or the link, as appropriate, for that word or words in the data structures 41, 41'.

Optionally, standard data compression and decompression techniques can be used to store the voice samples.

Described below are processes used to determine a nearest word in the image as well as a process used to highlight a word or apply double highlighting to a word. In essence, these processes can operate on a display of the document by use of the image file. The software makes reference to the OCR data structure 35 to determine positional information to associate the reading software, highlighting software or other software with respect to commands by the user. The above data structures 41 or 41' can be saved in a file for later use.

Figure 4D:
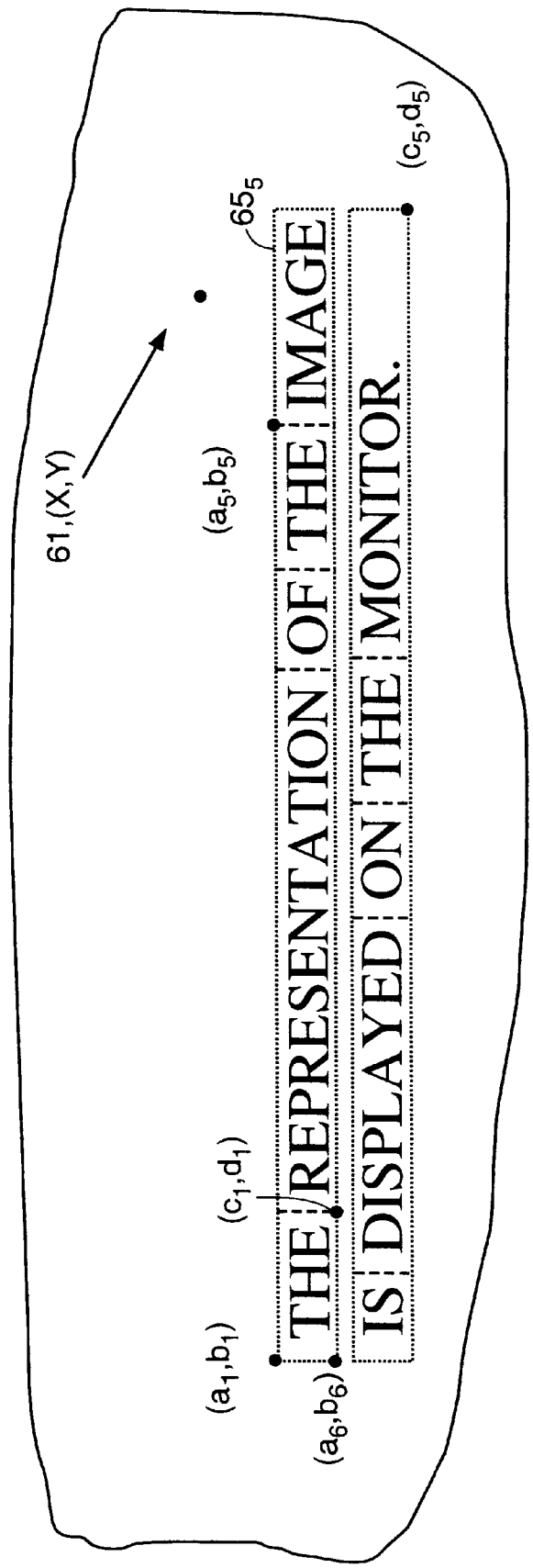
FIG. 4D is a pictorial illustration of a portion of an image representation of text displayed on a monitor useful in understanding the process of FIGS. 4A–4C.
Figure 6:
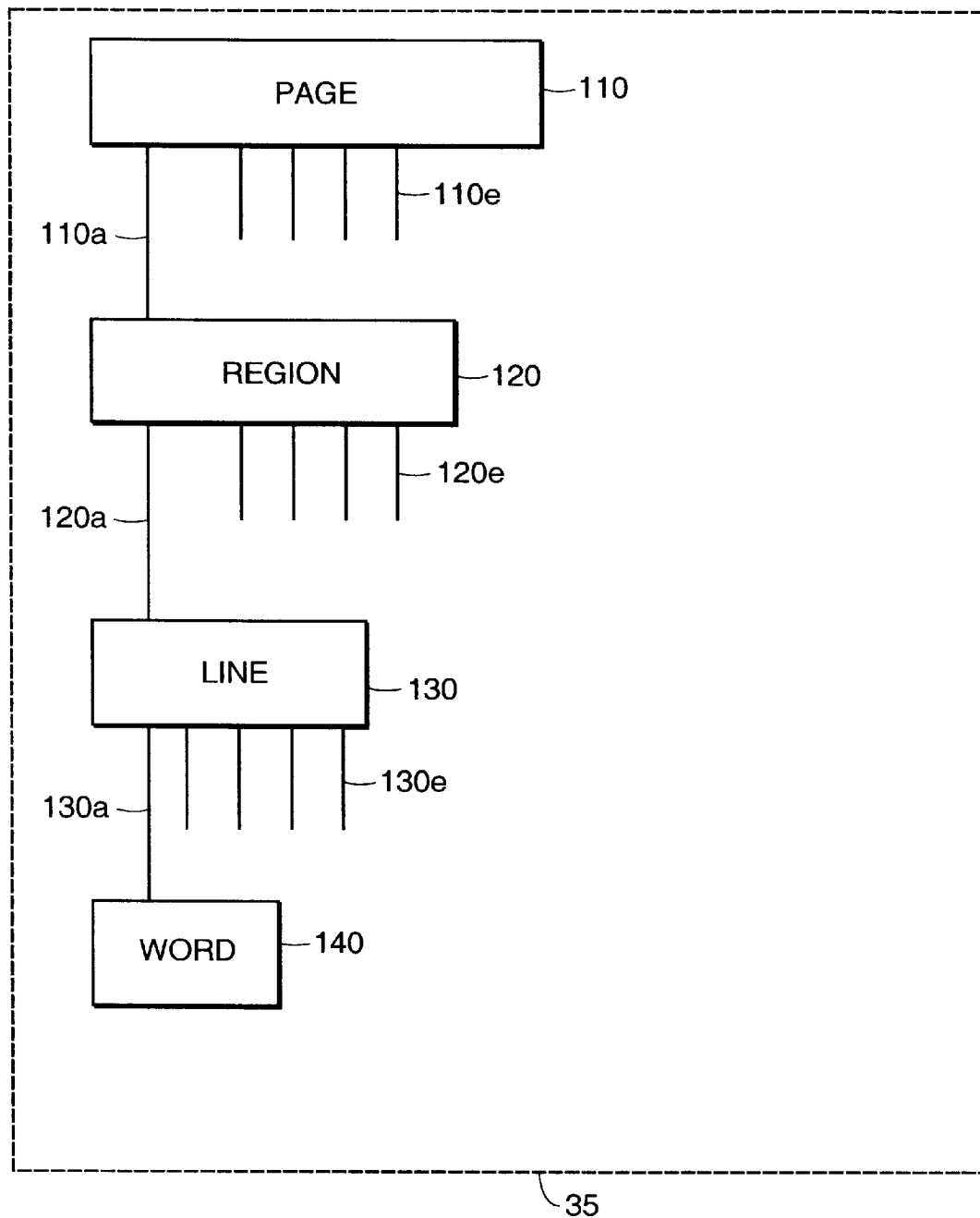
FIG. 6 is a diagrammatical representation of a data structure used in the process of FIG. 3.

Referring now to FIGS. 4A–4C, the process 46 used to determine a nearest word in an image display as pointed to by a user is shown. A pointer is initialized 60 and a maximum value is loaded into a displacement field 51b of structure 51 (FIG. 4D). The displacement field 51b is used to store the smallest displacement between a word boundary and the coordinates of the pointing device. The pointer that is initialized 60 is a pointer or index into the OCR generated data structure 35 (FIG. 6). The software 46 retrieves each word entry in the data structure 35 to determine for that word, in accordance with the image, relative position information associated with the OCR text generated word whether or not that particular word is the closest word to the coordinates associated with the user's pointing device.

The coordinates associated with a first one of the words are fetched 62. The coordinates associated with the first one of the fetched words are used to determine 64 whether the pointing device is pointing to a location within a box $65_5$ that is defined around the word. Thus, as shown in conjunction with FIG. 4D, the mouse points to a spot 61 having coordinates $X_i$, $Y_j$. For any document item on the scanned image, an imaginary box here $65_5$ is assumed to exist about the word "IMAGE" in FIG. 4D. Thus, if the pointing device coordinates fall within the box $65_5$, the pointing device would be considered to point to the document item "IMAGE" associated with the box $65_5$.

In the data structure 35 each of the words will have associated therewith the OCR text converted from the image file 31, as well as position and size data that identifies the position and size of the word as it appears on the original document. Accordingly, this information also locates the word as it appears in the displayed image representation of the document. Thus, when determining the closest word to a position pointed to by a mouse, it is necessary to determine the boundaries of the box occupied by the particular word. The software determines 64 whether or not point 61 falls within the box by considering the following:

For a mouse coordinate position (X, Y) the location pointed to by the mouse can be considered to be within a region of an image word having points defined by coordinates $(a_i, b_j)$ and $(c_k, d_l)$ where $c_k=a_i+h$ and $d_l=b_j-w$, if $X \geq a_i$ and $Y \leq b_j$ and $X \leq c_k$ and $Y \geq d_1$ where it is assumed here that the positive direction of the coordinates is upward and to the right.

If this condition is satisfied, then the point 61 can be considered to be within the box and, hence, control will pass 66 directly to 50 (FIG. 4B). From the information mentioned above, therefore, the point (c, d) can be determined by subtracting the height of the box from the x coordinate $(a_i)$ associated with the image and adding the width of the box associated with the y coordinate $(b_j)$ of the image.

If, however, the point 61 is not within the box as is shown, then the software 46 determines 68 the word which is nearest to the point 61 by one of several algorithms. A first algorithm which can be used is to compute the distance from a consistent corner of the box associated with the word to the position of the mouse pointer 61. In general, the distance (S) to a consistent corner would be computed as the "Pythagorean" technique as follows:

$$S=((X-a_i)^2+(Y-b_j)^2)^{-2}$$

Alternatively, this equation can be used at each corner of each box and further processing can be used to determine which one of the four values provided from each corner is in fact the lowest value for each box.

In either event, the computed value (S) is compared to the previous value stored in displacement field 51b. Initially, field 51b has a maximum value stored therein and the smaller of the two values is stored 72 in field 51b. Accordingly, the first computed value and the index associated with the word are stored in the structure 51, as shown in FIG. 4C. It is determined 74 whether or not this is the end of the data structure 35. If it is the end of the data structure 35 then control branches to 50 and hence to 52. If it is not the end of the data structure 35 then the pointer is incremented 76 and the next word in the data structure as determined by the new pointer value is fetched 62.

The second time through the process 46 in general will be the same as the first time except that the process 46 will determine 72 whether the previously stored value ($S_p$) in fields 51a, 51b is greater than or less than a current calculated value ($S_c$) for the current word. If the current value ($S_c$) is less than the previous value $S_p$, then the current value replaces the previous value in field 51b and the index associated with the current value replaces the previous index stored in field 51a.

In this manner, the structure 51 keeps track of the smallest calculated distance (S) and the index (i.e., word) associated with the calculated distance. The process continues until the is positional data for all of the words in the data structure associated with the particular image have been examined. The values which remain in the data structure 51 at the end of the process correspond to the closest word to the location given by the mouse coordinates 61.

Referring now back to FIG. 3, once the nearest coordinates for the nearest data item are determined, the process 40 applies highlighting as appropriate to the selected item. One technique for providing highlighting would simply highlight a line or a paragraph in the text representation displayed on the monitor. The highlighting would be of the current word that is being read aloud to the user. Although this is acceptable, a preferred approach as described herein applies double highlighting and still preferably applies double highlighting to an image representation of a scanned document.

The selected paragraph or sentence is highlighted with a first transparent color. Each individual word as read aloud by the recorded digitized voice samples is highlighted with a second, different transparent color. Accordingly, highlighting is applied 48 in a manner as will now be described.

Figure 5:
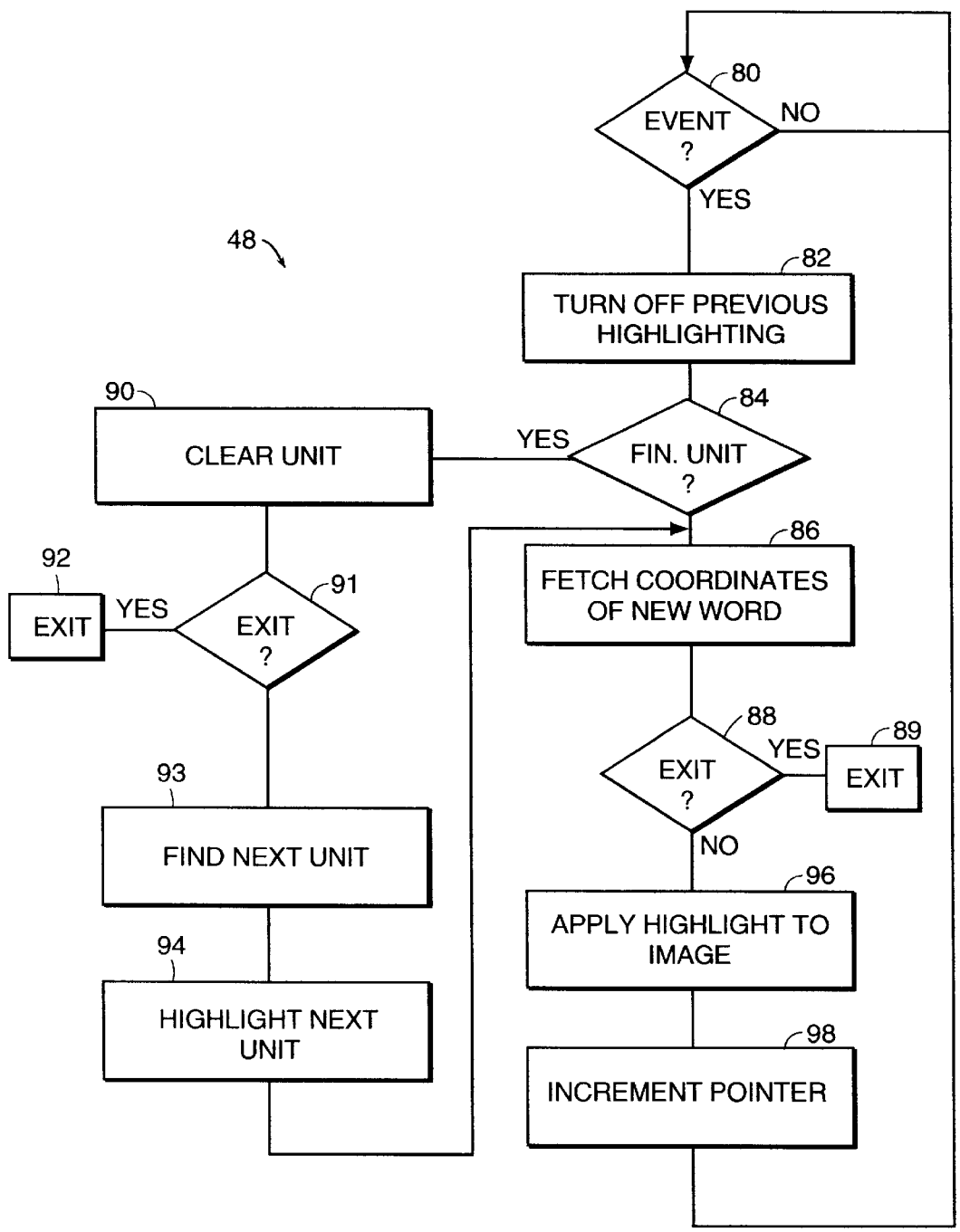
FIG. 5 is a flow chart showing a process to highlight a selected word for use in the process described in conjunction with FIG. 3.

Referring now to FIG. 5, the highlighting process 48 includes waiting 80 for an event by the software 48. The event is typically an operating system interrupt-type driven operation that indicates any one of a number of operations such as a user of the reading machine 10 initiating speech synthesis of a word, sentence or paragraph. The highlighting process 48 remains in that state until an event occurs. When an event occurs all previous highlighting is turned off 82. The previous highlighting is turned off by sending a message (not shown) to the display system 38 causing the display system to remove the highlighting. The highlighting process checks 84 whether a unit of text has been completed. For example, a unit can be a word, line, sentence, or a paragraph, for example, as selected by the user.

If a unit of text has been completed, then highlighting of the unit is also turned off 90. The software checks for an exit condition 91 after the coordinates have been fetched. An exit condition can be any one of a number of occurrences such as reaching the last word in the array of OCR data structures 35 or a user command to stop. If an exit condition 92 has occurred, the routine 48 exits to 92.

If an exit condition has not occurred, the next unit is determined 93. The next unit of text is determined by using standard parsing techniques on the array of OCR text structures 35. Thus, the next unit is determined by looking for periods, for example, to demarcate the end of sentences, and indents and blank lines to look for paragraphs. In addition, changes in the Y coordinate can be used to give hints about sentences and lines. Other document structure features can also be used. The next unit is then highlighted 94 by instructing the display system software 38 (FIG. 2) to apply a transparent color to the selected next unit. This is a first level of highlighting provided on a unit of the image representation of the scanned document. Control transfers back to 86.

The coordinates of the next word are fetched 86. The software checks 88 for an exit condition after the coordinates have been fetched. An exit condition can be any one of a number of occurrences such as reaching the last word in the array of OCR data structures 35 or a user command to stop provided from the keyboard 18 or other input device. If an exit condition has occurred 88, the routine 48 exits 89. Otherwise, a second highlight is applied 96 to the image, here preferably with a different transparent color and applied only to the word that is read aloud in the recorded digitized human voice. The pointer to the next word in the data structure 35 is incremented 98 to obtain the next word. The second highlighting is provided by sending a message to display system software 38 containing the positional information retrieved from the data structure. This process continues until an exit condition occurs 88.

It should be noted that the single and the dual highlighting above were described as applying two distinct, transparent colors to the image representation of the displayed document. Alternatively, however, other highlighting indicia can be used such as bold text, font style or size changes, italics, boxing in selected text, and underlining. In addition, combinations of these other indicia with or without colors could be used.

Referring now to FIGS. 6–9, a preferred format for the data structure 35, as provided by the OCR 34, is shown. The data structure 35 is hierarchically organized. At the top of the data structure is a page, data structure 110. The page includes pointers 110a–110e to each one of a plurality of regions 120. A region is here a rectangular-shaped area comprising one or more rectangular lines of text. If there are multiple lines of text in a region, the lines do not overlap in the vertical direction. That is, starting with the top line, the bottom of each line is above the top of the next line. Here the regions may include headers, titles, columns and so forth. The headers may or may not straddle more than one column and so forth. The regions likewise include a plurality of pointers 120a–120e to each one of corresponding lines 130 shown in the data structure 130. The lines correspondingly have pointers 130a–130e to each of the words contained within the line.

Figure 8:
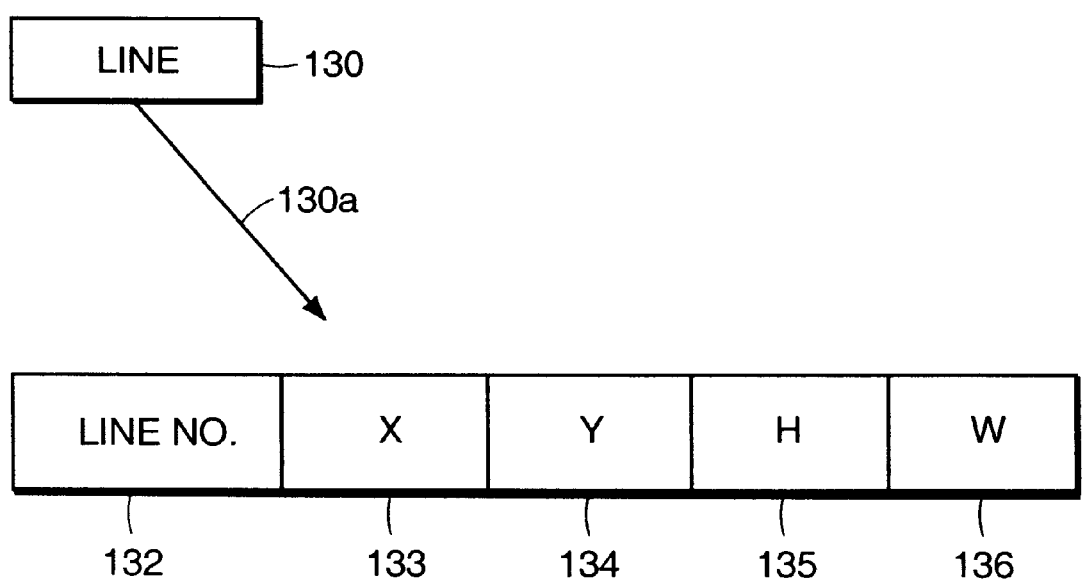
Figure 9:
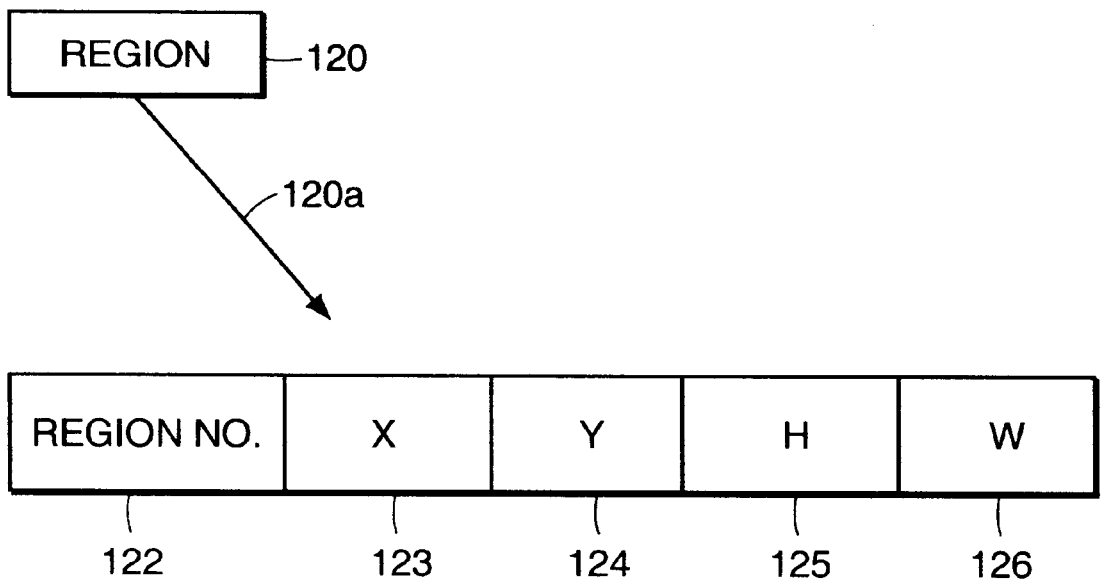

As shown in conjunction with FIGS. 7–9, the detail structure of items 140, 130 and 120 include a plurality of fields. Thus, for example, FIG. 7 for the word includes the text field 142 which has the OCR generated text and has fields 143 and 144 which provide rectangular coordinate information x and y, respectively, as well as fields 145 and 146 which provide here height and width information. Similar data are provided for the lines as shown in FIG. 8 as well as regions as shown in FIG. 9.

Now to be described will be a preferred method 46' to determine the nearest word associated with the position of a mouse or other pointing device. This approach is particularly advantageous for those situations where dragging operations of a mouse are often performed. The image representation may not provide an exact correspondence to the text as determined by the OCR recognition system. Also sometimes incorrect text is selected because the user does not precisely place the mouse or other pointing device directly on the desired item in the image representation. Also, when the pointer is positioned in the white space between lines, or in the white space to the left or right of lines, choosing the closest word to the pointer will not always give the result that a computer user would normally expect, based on the behavior of mouse selection on standard computer text displays. Moreover, minor misalignments may also occur between the image representation as displayed on the display and as provided by the OCR text file.

Figure 11:
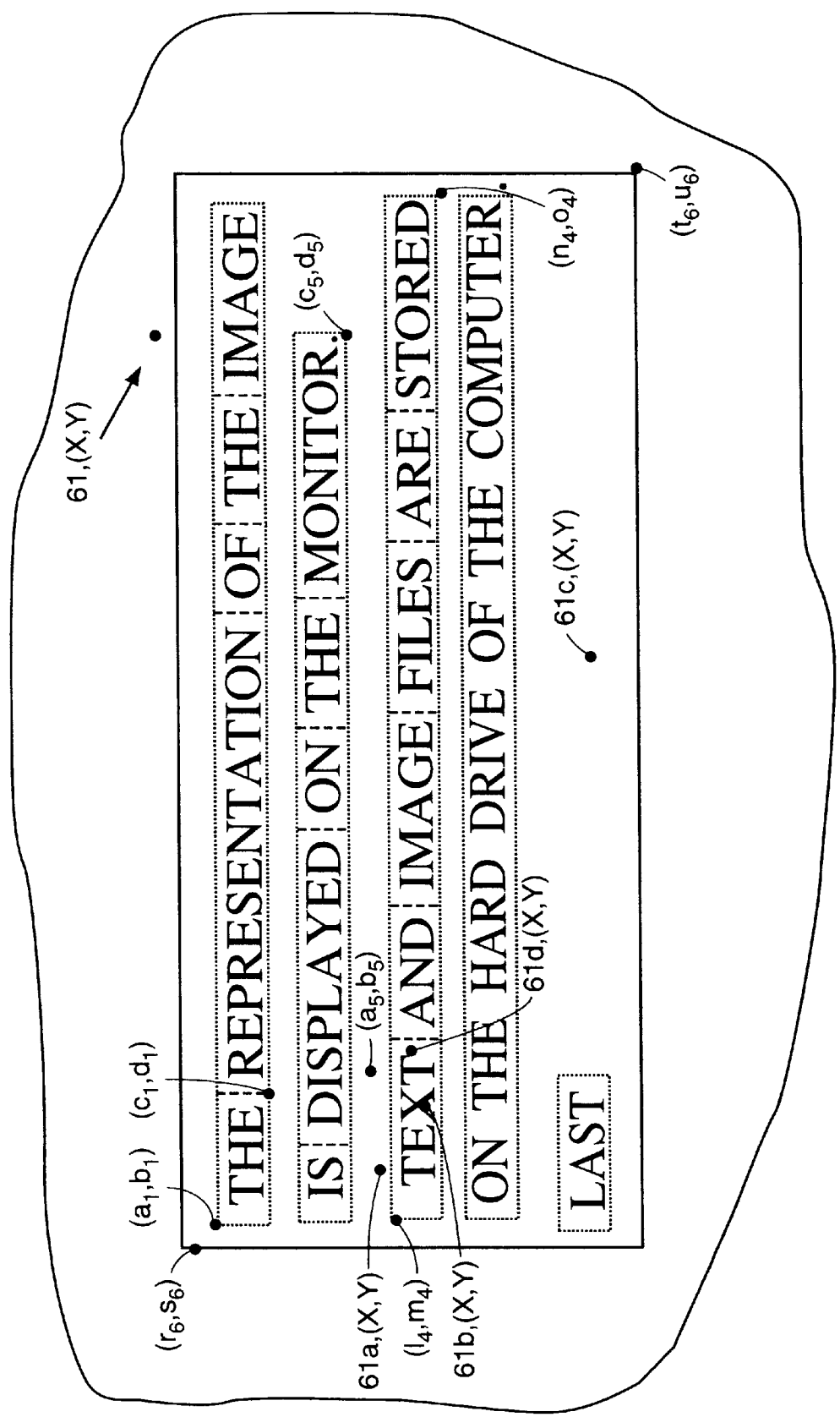
FIG. 11 is a pictorial illustration of a portion of an image representation of text displayed on a monitor useful in understanding the process of FIGS. 10A–10C.

Thus, for example, consider point 61c on FIG. 11. In the method 46 previously described, the closest word, which is "OF" in the previous line, will be chosen as the selected word. But on standard computer displays the point of selection would be after the word "LAST."

Figure 10A:
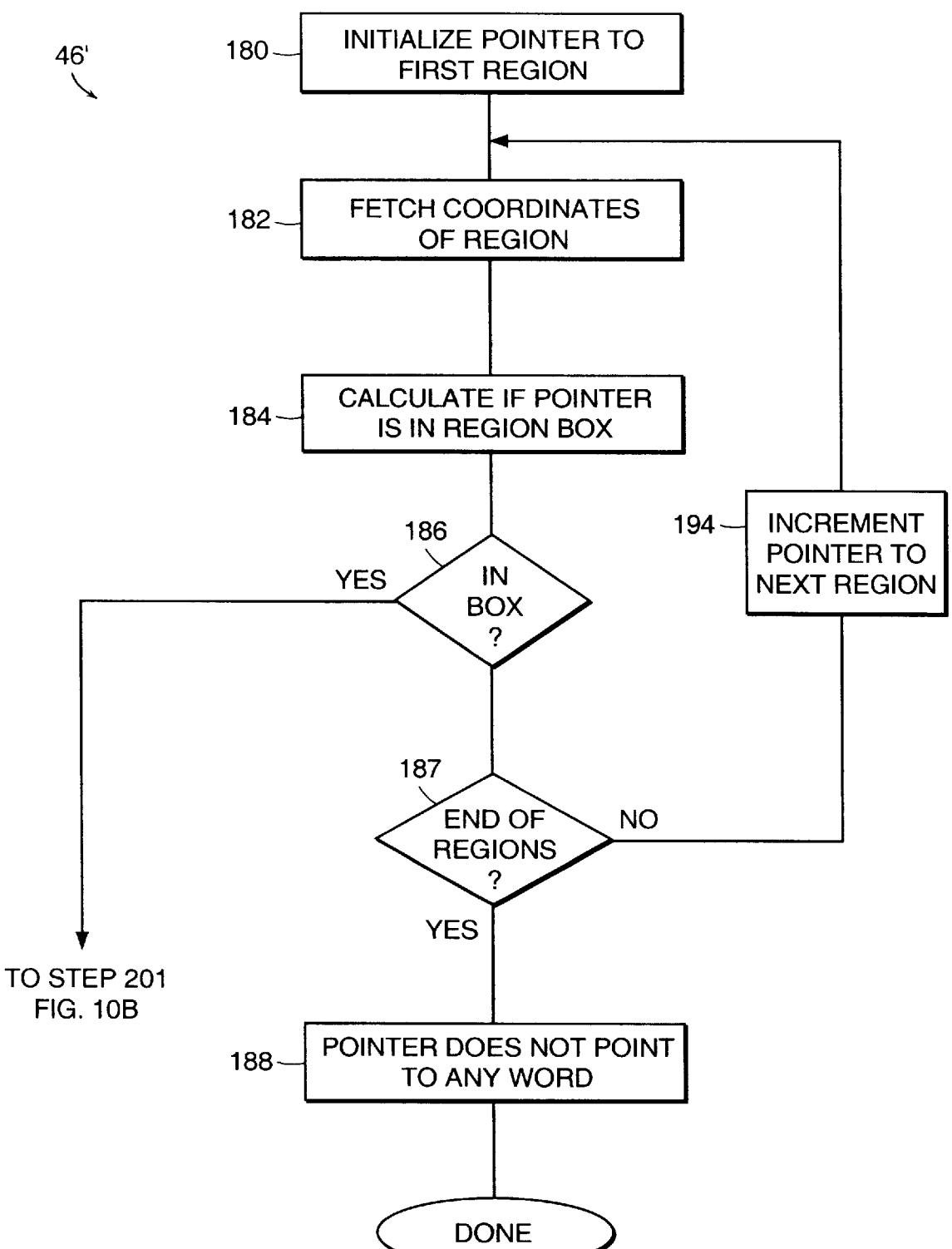
FIGS. 10A–10C are flow charts of an alternative embodiment for determining the nearest word.
Figure 10B:
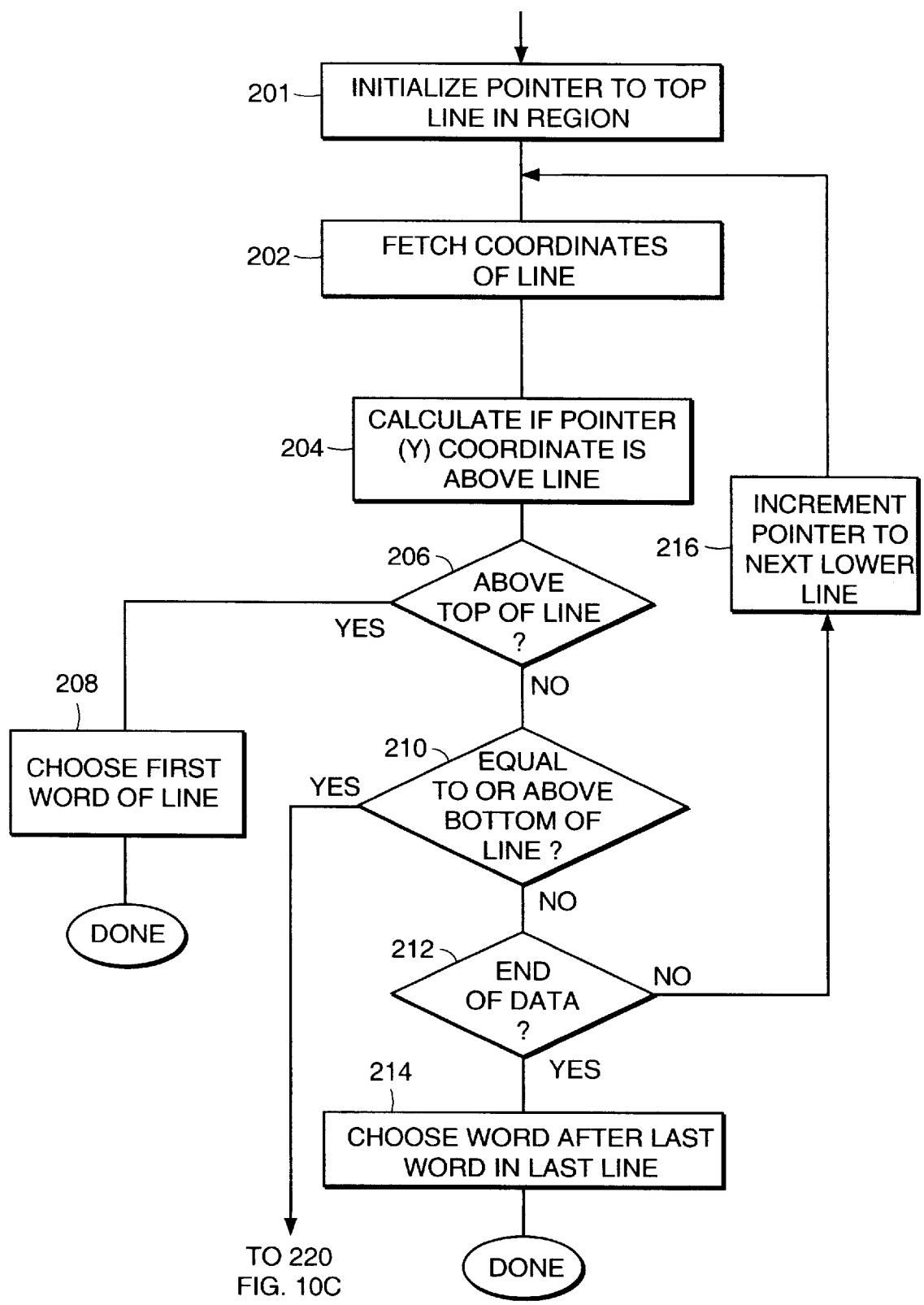
Figure 10C:
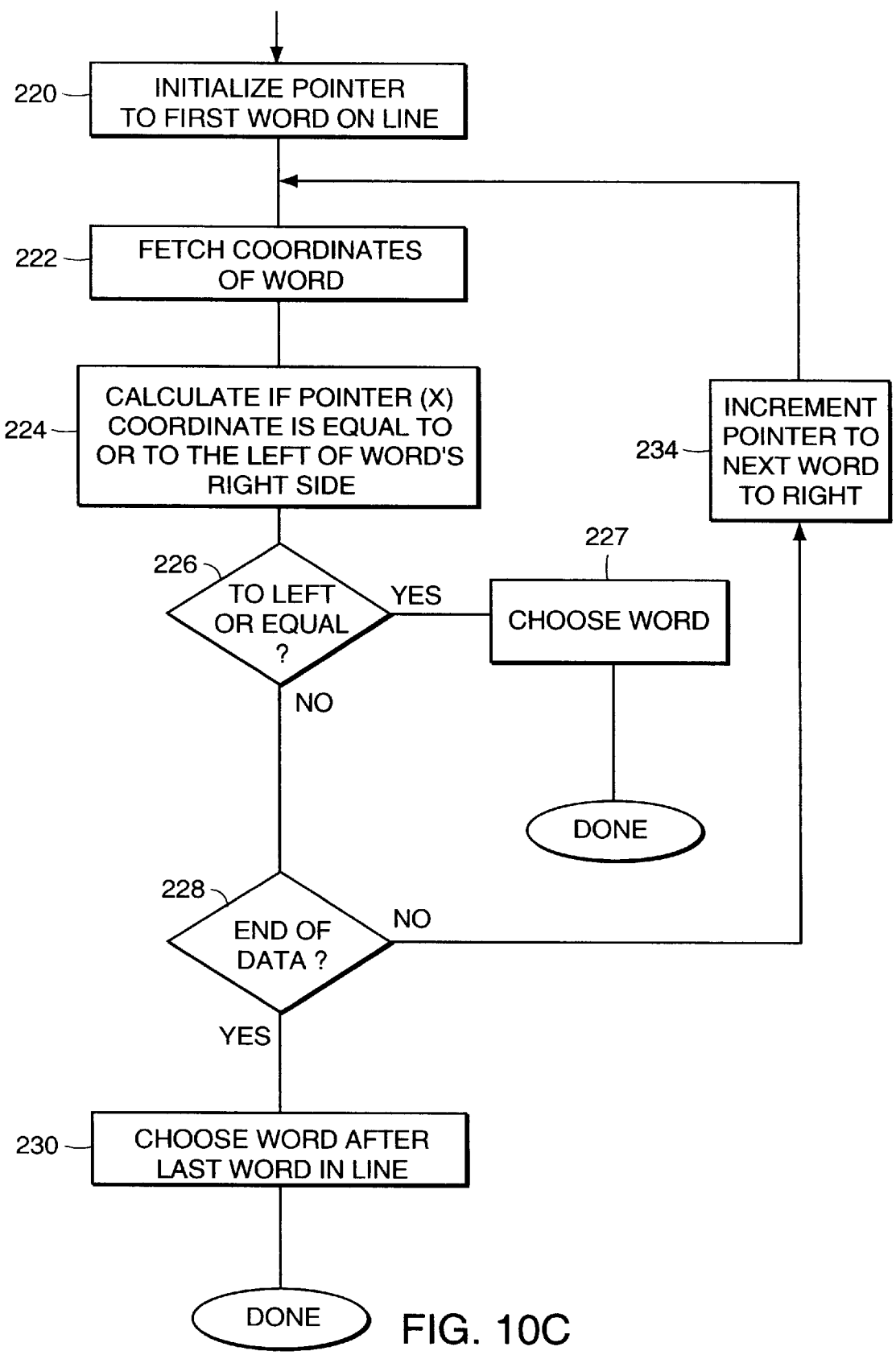

The approach as shown in conjunction with FIGS. 10A–10C will tend to mitigate some of these errors.

Referring now to FIG. 10A, pointers are again initialized 180 to a first one of the regions and the coordinates of the region's boundary box are fetched from the data structure 120. The position (X, Y) of the pointer is calculated to determine whether or not it falls within a box defining a region.

To further illustrate this process, reference is also made to FIG. 11 which shows a sample region containing a plurality of lines of text in the image-based representation and boxes illustrated about the region, lines and word. Also three sample positions 61, 61a, 61b of the pointing device (not shown) are illustrated.

The calculation for a region is performed in a similar manner as for calculating a box for a word described in conjunction with FIGS. 5A to 5C except that the positional information contained within the region data structure 120 is used to determine a box or other boundary associated with the region. Coordinates $(r_6, s_6)$ and $(t_6, u_6)$ denote the imaginary box about the illustrated region in FIG. 11. If it is determined 186 that the coordinates of the pointer fall within the box (as 61 and 61a–61d, FIG. 11), then the process branches to determine 201 (FIG. 10B) the nearest line 201 (FIG. 10B). Otherwise processing continues to determine 187 whether or not the process has reached the last region in the region data structure 120. If it has not reached the last structure, the pointer is incremented 194 to point to the next region in the data structure 120. If the process 46' has reached the last structure the coordinates of the pointer device do not point to any word, as 61, (FIG. 11). Therefore, a previously determined word is used, and the process exits.

If it was determined 186 that the coordinates fall within a region's box, then a similar process 201 is used to determine the nearest line except that the line data associated with the data structure 130 (FIG. 8) is used for positional information and index information such as coordinates $(l_4, m_4)$ and $(n_4, o_4)$. Again for each line within the particular region, positional information is used to determine whether the coordinates of the pointing device are within a box defined about the line by the positional information associated with the line. If the coordinates of the positioning device fall above the box associated with the line as point 61a, then the software will choose the first word of the line, here the word "TEXT." If the coordinates fall above the bottom of the line box as point 61b, then the software branches to 220.

As shown in conjunction with FIG. 10B, the software initializes 201 a pointer to the top line in the region and fetches 202 the coordinates of the line. The coordinates which are fetched correspond to the top and bottom coordinates of an imaginary box positioned about the line. The software calculates 204 whether the Y coordinate of the pointing device is above the line. This is accomplished by comparing the value of the Y coordinate of the pointing device to the Y coordinate $(m_4)$ of the uppermost point defining the box about the line, as shown for point 61b. If it is determined 206 that the Y coordinate is above the box defined about the line, the software chooses 208 the first word on the line and is done. Otherwise, the software determines whether the Y coordinate is above the bottom of the box defining the line by using a similar approach as for the top of the line except using, for example, the coordinate ($O_4$). If it is determined that the Y coordinate is equal to or above the bottom of the box defining the line, as point 61b then the software branches to 220 (FIG. 10C).

The X coordinate of the pointer is already known to be in the region and is not checked here. This allows for short lines to be detected. Lines are often shorter than the width of the region. For example, short lines may occur at the beginning and end of paragraphs or in text that is not justified to form a straight right margin. Otherwise, it continues to 212 where it is determined whether the current line is the last line in the data structure 230. If it is not the last line in data structure 230, the pointer is incremented 216 to point to the next lower line in the region. If it is the last line in the data structure and the Y coordinate was not above the top of the line nor above the bottom of the line, the software chooses 214 the word after the word in the last line as for point 61c and is done.

Referring now to FIG. 10C, pointers are again initialized to a first one of the words on a line, as shown by 220 and the coordinates of the word are fetched 222 from the data structure 140. The position X of the pointer is calculated at 224. This calculation is performed to determine whether or not the X position of the pointer falls at or to the left of the current word's right side, as shown for point 61a. This calculation is performed by comparing the X value of the pointer coordinate to the X value of the right side of the box defined about the word here coordinate $a_5$ of point ($a_5,b_5$). If the value of the X coordinate for the box is less than or equal to that of the X coordinate of the pointing device, then the pointing device is considered pointing to the left side of the word's right side. It is determined 226 whether the pointer points to the left side of the word's right side. If it does, the particular word "TEXT" is chosen 227 for point 61d and the process is done. Otherwise, the process determines 228 whether or not it has reached the last word in the data structure 140. If it has not reached the last word in the data structure 140, the pointer is incremented 234 to point to the next word to the right. If it has reached the last word in the data structure 140, the software will choose 230 the word after the last word in the line (not illustrated) and the process is done.

The chosen word is forwarded to 48 of FIG. 3. In this manner double highlighting, as described in conjunction with FIG. 5, is performed on the word chosen by this process. The reading machine can read the word aloud using synthesized speech or a recorded human voice, as also described above.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A computer program residing on a computer readable medium comprising instructions for causing a computer to:

record the voice of an operator of the reading machine as a plurality of voice samples in synchronization with a highlighting indicia applied to a displayed document; and store the plurality of voice samples in a data structure in a manner that associates the plurality of voice samples with displayed positions of words in the document.

2. The computer program product of claim 1 further comprising instructions for causing a computer to:

apply highlighting to the displayed document a word at a time to indicate the word the operator should pronounce into a microphone.

3. The computer program product of claim 1 wherein the voice samples are stored along with positional information obtained from a text-based data structure.

4. The computer program product of claim 3 wherein the voice samples are stored along with links back to a text-based data structure that contains the positional information of the recorded words.

5. The computer program product of claim 3 further comprising instructions for causing the computer to playback voice samples, and use a visual sound editor to permit an operator to identify a word or words corresponding to the voice samples and correct the positional information or links back to the text-based data structure for the word or words.

6. The computer program product of claim 2 wherein the record process uses a large vocabulary continuous speech recognition software system to transcribe the recorded speech, and mark where voice samples for words are in a voice sample data structure.

7. The computer program product of claim 2 wherein the speech recognition software uses transcribed text provided from applying optical character recognition to an image representation of a document to produce the text file.

* * * * *

UNITED STATES PATENT AND TRADEMARK OFFICE
CERTIFICATE OF CORRECTION

PATENT NO.    : 6,199,042 B1
DATED         : March 6, 2001
INVENTOR(S)   : Raymond C. Kurzweil It is certified that error appears in the above-identified patent and that said Letters Patent is hereby corrected as shown below:

<u>Title page,</u>
Item [54], replace "READING SYSTEM" with -- COMPUTER SPEECH READING SYSTEM USING HUMAN VOICE AND TEXT DISPLAY --.

Signed and Sealed this

Thirtieth Day of October, 2001

Attest:

*Nicholas P. Godici*

NICHOLAS P. GODICI
*Attesting Officer*     *Acting Director of the United States Patent and Trademark Office*